(12) United States Patent
Mori et al.

(10) Patent No.: US 9,726,060 B2
(45) Date of Patent: Aug. 8, 2017

(54) CHEMICAL HEAT STORAGE DEVICE

(71) Applicant: KABUSHIKI KAISHA TOYOTA JIDOSHOKKI, Aichi (JP)

(72) Inventors: Kenji Mori, Aichi (JP); Satoshi Hariu, Aichi (JP); Takafumi Yamasaki, Aichi (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 14/902,372

(22) PCT Filed: Jun. 6, 2014

(86) PCT No.: PCT/JP2014/065142
§ 371 (c)(1),
(2) Date: Dec. 31, 2015

(87) PCT Pub. No.: WO2015/001910
PCT Pub. Date: Jan. 8, 2015

(65) Prior Publication Data
US 2016/0369675 A1    Dec. 22, 2016

(30) Foreign Application Priority Data

Jul. 4, 2013    (JP) .................................. 2013-140772

(51) Int. Cl.
*F01N 3/00*        (2006.01)
*F01N 3/20*        (2006.01)
(Continued)

(52) U.S. Cl.
CPC ......... *F01N 3/2006* (2013.01); *F01N 3/0871* (2013.01); *F01N 3/103* (2013.01);
(Continued)

(58) Field of Classification Search
USPC ......... 60/272, 282, 286, 293, 298, 299, 300, 60/303, 320
See application file for complete search history.

(56) References Cited

U.S. PATENT DOCUMENTS 8,800,502 B2 *   8/2014   Choi ........................ F01P 11/00
                                                    123/198 D
8,893,484 B2 *  11/2014   Park ......................... F01N 5/02
                                                    60/274
(Continued)

FOREIGN PATENT DOCUMENTS

EP        3 012 569        4/2016
JP        4-347320        12/1992
(Continued)

OTHER PUBLICATIONS

International Search Report for PCT/JP2014/065142, dated Sep. 9, 2014, along with English-language translation thereof.
(Continued)

*Primary Examiner* — Binh Q Tran
(74) *Attorney, Agent, or Firm* — Greenblum & Bernstein, P.L.C.

(57) ABSTRACT

A chemical heat storage device includes a reactor disposed around an oxidizing catalyst and containing $MgCl_2$ which chemically reacts with $NH_3$ to generate heat, a storage connected to the reactor through a pipe to store $NH_3$, an on-off valve disposed in the pipe, a temperature sensor detecting the temperature of the exhaust gas passing through the oxidizing catalyst, and a controller controlling the on-off valve based on the detected value of the temperature sensor. The controller controls the on-off valve such that the on-off valve unconditionally opens if the temperature of the exhaust gas is greater than a heat generating start temperature $T_L$ and is equal to or less than a heat generating end
(Continued)

guide temperature $T_Q$, and the on-off valve unconditionally opens if the temperature of the exhaust gas is greater than a regenerating temperature $T_H$.

3 Claims, 4 Drawing Sheets

(51) Int. Cl.
    *F01N 3/10*     (2006.01)
    *F01N 3/26*     (2006.01)
    *F28D 20/00*     (2006.01)
    *F01N 3/08*     (2006.01)
    *F01N 3/24*     (2006.01)

(52) U.S. Cl.
    CPC ................. *F01N 3/24* (2013.01); *F01N 3/26* (2013.01); *F28D 20/003* (2013.01); *F01N 2240/02* (2013.01); *Y02E 60/142* (2013.01); *Y02T 10/26* (2013.01)

(56) References Cited

U.S. PATENT DOCUMENTS 9,140,500 B2 * 9/2015 Goto .................. F02G 5/00
9,228,472 B2 * 1/2016 Greiner .............. B60H 1/00492
2002/0139114 A1 * 10/2002 Dickau .................... F01N 3/05
                                              60/300
2012/0251394 A1 * 10/2012 Komaki ............... F28D 20/003
                                              422/109

FOREIGN PATENT DOCUMENTS

| JP | 9-13960 | 1/1997 |
| JP | 11-311117 | 11/1999 |
| JP | 2001-289039 | 10/2001 |
| JP | 2011-208865 | 10/2011 |

OTHER PUBLICATIONS

English-language translation of Written Opinion of the International Searching Authority, dated Sep. 9, 2014.

English-language translation of International Preliminary Report on Patentability, dated Jan. 5, 2016.

Extended European Search Report for EP 14820349.0 having a mailing date of Feb. 10, 2017.

* cited by examiner

CHEMICAL HEAT STORAGE DEVICE

TECHNICAL FIELD

The present invention relates to a chemical heat storage device which heats a target object of heating disposed in an exhaust air system of an engine.

BACKGROUND ART

As the conventional chemical heat storage devices, for example, a chemical heat storage device described in Patent Literature 1 is known. The chemical heat storage device described in Patent Literature 1 includes a first container disposed upstream of a catalyst body in a gas passage pipe and accommodating an adsorbent which adsorbs/desorbs water as an adsorbed medium to generate/absorb heat, a second container disposed externally to the gas passage pipe and accommodating the adsorbed medium, a communicating pipe communicating the first container with the second container, and an on-off valve disposed halfway of the communicating pipe. If an ignition key is turned on (engine is started), and the on-off valve is opened, the catalyst body is heated and activated by the heat generated accompanying adsorption by the adsorbent. If the catalyst body is sufficiently activated, the adsorbent receiving the heat of the catalyst body is desorbed and be regenerated.

CITATION LIST

Patent Literature

Patent Literature 1: Japanese Patent Application Laid-Open No. 11-311117

SUMMARY OF INVENTION

Technical Problem

However, there are the following problems in the conventional techniques. Namely, if the ignition key is turned on, the on-off valve is opened; if the ignition key is turned off, the on-off valve is closed. For this reason, once the ignition key is turned on, the on-off valve remains open until the ignition key is turned off; for this reason, the adsorbed medium goes back and forth between the first container and the second container depending on the temperature of the exhaust gas to perform the exothermic reaction and the regeneration reaction. Accordingly, if the temperature of the exhaust gas tends to decrease during regeneration, for example, the reverse reaction (exothermic reaction) may occur. In generation of heat, the adsorbed medium accommodated in the second container is fed to the first container to continuously react with the adsorbent until the temperature of the exhaust gas reaches the regenerating temperature; for this reason, the amount (charge quantity) of the adsorbed medium in the second container is reduced.

An object of the present invention is to provide a chemical heat storage device which can appropriately perform the regeneration reaction and the exothermic reaction according to the temperature of the exhaust gas.

Solution to Problem

The present invention is a chemical heat storage device which heats a target object of heating disposed in an exhaust air system of an engine, the chemical heat storage device including a reactor disposed around the target object of heating and having a heat generating material which chemically reacts with a reaction medium to generate heat, a storage connected to the reactor through a pipe to store the reaction medium, an on-off valve disposed in the pipe to open/close a flow path for the reaction medium, a detecting unit detecting a detection target corresponding to the temperature of an exhaust gas passing through the target object of heating, and an on-off valve control unit controlling the on-off valve based on a detected value of the detecting unit.

As described above, in the chemical heat storage device according to the present invention, by detecting the detection target corresponding to the temperature of the exhaust gas passing through the target object of heating to control the on-off valve based on the detected value, the on-off valve can be appropriately controlled according to the temperature of the exhaust gas passing through the target object of heating during regeneration in which the reaction medium and the heat generating material are separated by the heat from the target object of heating and during generation of heat in which heat is generated by the chemical reaction between the reaction medium and the heat generating material. Thereby, the regeneration reaction and the exothermic reaction can be appropriately performed according to the temperature of the exhaust gas. Here, the detection target corresponding to the temperature of the exhaust gas passing through the target object of heating indicates a variety of parameters varying according to the temperature of the exhaust gas, such as the temperature of the exhaust gas itself, the temperature of the target object of heating, the temperature of the reactor, and the pressure of the reactor.

Preferably, the on-off valve control unit controls the on-off valve such that the on-off valve opens if the detected value of the detecting unit is greater than a first predetermined value at which the reaction medium desorbs from the heat generating material due to heat, controls the on-off valve such that the on-off valve opens if the detected value of the detecting unit is equal to or less than a second predetermined value lower than the first predetermined value, and controls the on-off valve such that the on-off valve closes if the detected value of the detecting unit is equal to or less than the first predetermined value and greater than the second predetermined value.

As described above, by controlling the on-off valve such that the on-off valve opens if the detected value of the detecting unit is greater than the first predetermined value at which the reaction medium desorbs from the heat generating material due to heat, the on-off valve is closed if the temperature of the exhaust gas is equal to or less than the first predetermined value; accordingly, the occurrence of the reverse reaction (exothermic reaction) during regeneration can be prevented. Moreover, by controlling the on-off valve such that the on-off valve opens if the detected value of the detecting unit is equal to or less than the second predetermined valve lower than the first predetermined value, the on-off valve is closed and the exothermic reaction is not performed if the detected value of the detecting unit is greater than the second predetermined value during generation of heat; for this reason, the amount (charge quantity) of the reaction medium stored in the storage can be saved.

Moreover, preferably, the on-off valve control unit controls the on-off valve such that if the detected value of the detecting unit is greater than the first predetermined value and is equal to or less than a third predetermined value greater than the first predetermined value, the on-off valve closes if the amount of change in the detected value of the detecting unit is less than 0, and the on-off valve opens if the amount of change in the detected value of the detecting unit is 0 or more.

If the amount of change in the detected value of the detecting unit is less than 0 during regeneration, for example, if the temperature of the exhaust gas tends to decrease, the reverse reaction (exothermic reaction) readily occurs. Then, if the detected value of the detecting unit is equal to or less than the third predetermined value greater than the first predetermined value, by controlling the on-off valve such that the on-off valve closes if the amount of change in the detected value of the detecting unit is less than 0, and the on-off valve opens if the amount of change in the detected value of the detecting unit is 0 or more, the occurrence of the reverse reaction during regeneration can be surely prevented while the regeneration reaction is effectively performed in a wide temperature range.

Furthermore, preferably, if the detected value of the detecting unit is equal to or less than the second predetermined value and is greater than a fourth predetermined value less than the second predetermined value, the on-off valve control unit controls the on-off valve such that the on-off valve closes if the amount of change in the detected value of the detecting unit is more than 0, and the on-off valve opens if the amount of change in the detected value of the detecting unit is 0 or less.

If the detected value of the detecting unit is less than the second predetermined value and the amount of change in the detected value of the detecting unit is more than 0, for example, if the temperature of the exhaust gas tends to increase, any particular trouble is not caused even if the exothermic reaction is forcibly terminated. If the detected value of the detecting unit is greater than the fourth predetermined value less than the second predetermined value, by controlling the on-off valve such that the on-off valve closes if the amount of change in the detected value of the detecting unit is more than 0, and the on-off valve opens if the amount of change in the detected value of the detecting unit is 0 or less, the amount of the reaction medium stored in the storage can be more significantly saved.

Moreover, preferably, the on-off valve control unit controls the on-off valve such that the on-off valve closes if the detected value of the detecting unit is equal to or less than the second predetermined value and the detected value of the detecting unit is equal to or less than a fifth predetermined value at which the target object of heating cannot reach the target temperature even if the reaction medium is chemically reacted with the heat generating material.

If the temperature of the exhaust gas is excessively low, the target object of heating is difficult to reach the target temperature even by performing the exothermic reaction. Then, by controlling the on-off valve such that the on-off valve closes if the detected value of the detecting unit is equal to or less than the fifth predetermined value at which the target object of heating cannot reach the target temperature even if the reaction medium is chemically reacted with the heat generating material, exothermic reaction does not occur. Accordingly, an efficient exothermic reaction can be performed.

Advantageous Effects of Invention

According to the present invention, the regeneration reaction and the exothermic reaction can be appropriately performed according to the temperature of the exhaust gas. Thereby, the chemical heat storage device can be utilized to the maximum.

DESCRIPTION OF EMBODIMENTS

Hereinafter, a suitable embodiment of the chemical heat storage device according to the present invention will be described in detail with reference to the drawings.

Figure 1:
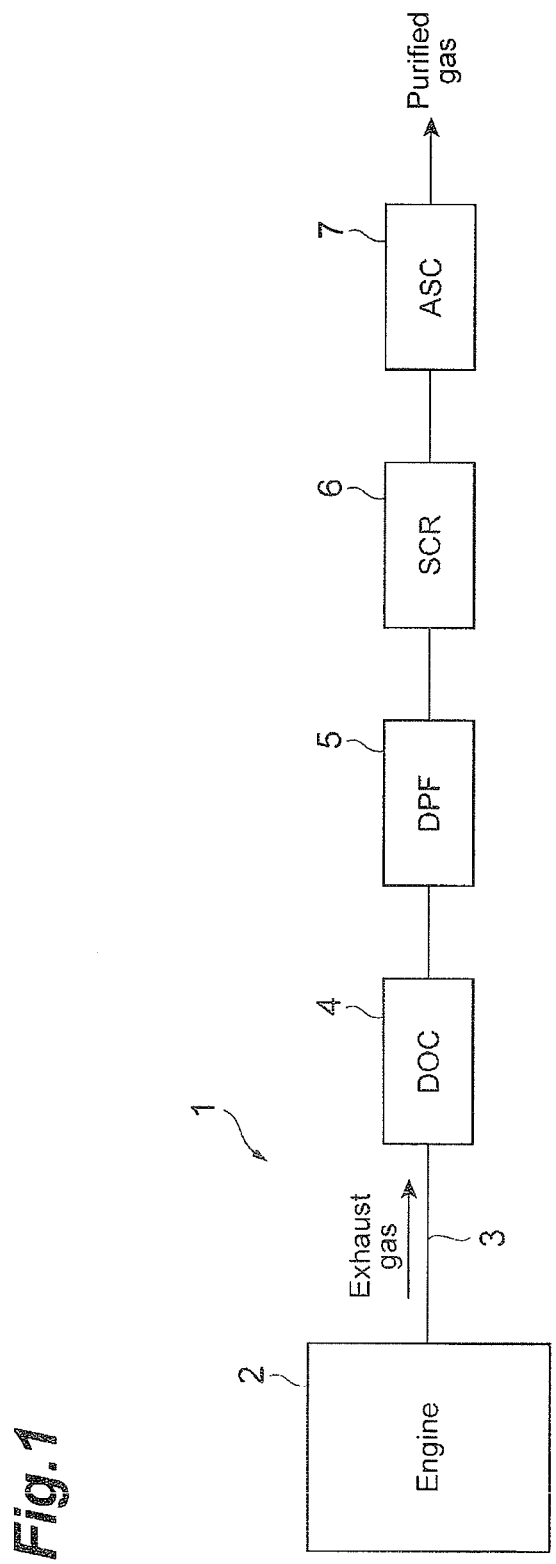
FIG. 1 is a schematic configuration showing an exhaust air purifying system including an embodiment of the chemical heat storage device according to the present invention.

FIG. 1 is a schematic configuration showing an exhaust air purifying system including an embodiment of the chemical heat storage device according to the present invention. In the drawing, an exhaust air purifying system 1 is a system disposed in an exhaust air system of a diesel engine 2 (hereinafter simply referred to as engine 2) in a vehicle and purifying hazardous substances (environmental contaminants) contained in the exhaust gas emitted from the engine 2.

The exhaust air purifying system 1 includes an oxidizing catalyst (DOC: Diesel Oxidation Catalyst) 4, a diesel exhaust air particulate removing filter (DPF: Diesel Particulate Filter) 5, a selective reducing catalyst (SCR: Selective Catalytic Reduction) 6, and an oxidizing catalyst (ASC: Ammonia Slip Catalyst) 7 in sequence from upstream to downstream in the middle of an exhaust air pipe (exhaust air system) 3 connected to the engine 2.

The oxidizing catalyst 4 is a catalyst which oxidizes HC, CO and the like contained in the exhaust gas to purify the exhaust gas. DPF 5 is a filter which captures PM contained in the exhaust gas to remove PM. SCR 6 is a catalyst to which urea or ammonia is fed to reduce $NO_x$ contained in the exhaust gas to purify the exhaust gas. The oxidizing catalyst 7 is a catalyst which oxidizes $NH_3$ flowing downstream of the SCR 6.

By the way, there is a temperature region (active temperature) of the exhaust air catalyst such as the oxidizing catalyst 4 in which the catalyst demonstrate an ability to purify environment contaminants. Accordingly, if the temperature of the exhaust gas is low, for example, immediately after the engine 2 is started, the oxidizing catalyst 4 needs to be heated to increase the temperature of the oxidizing catalyst 4 to the active temperature.

Figure 2:
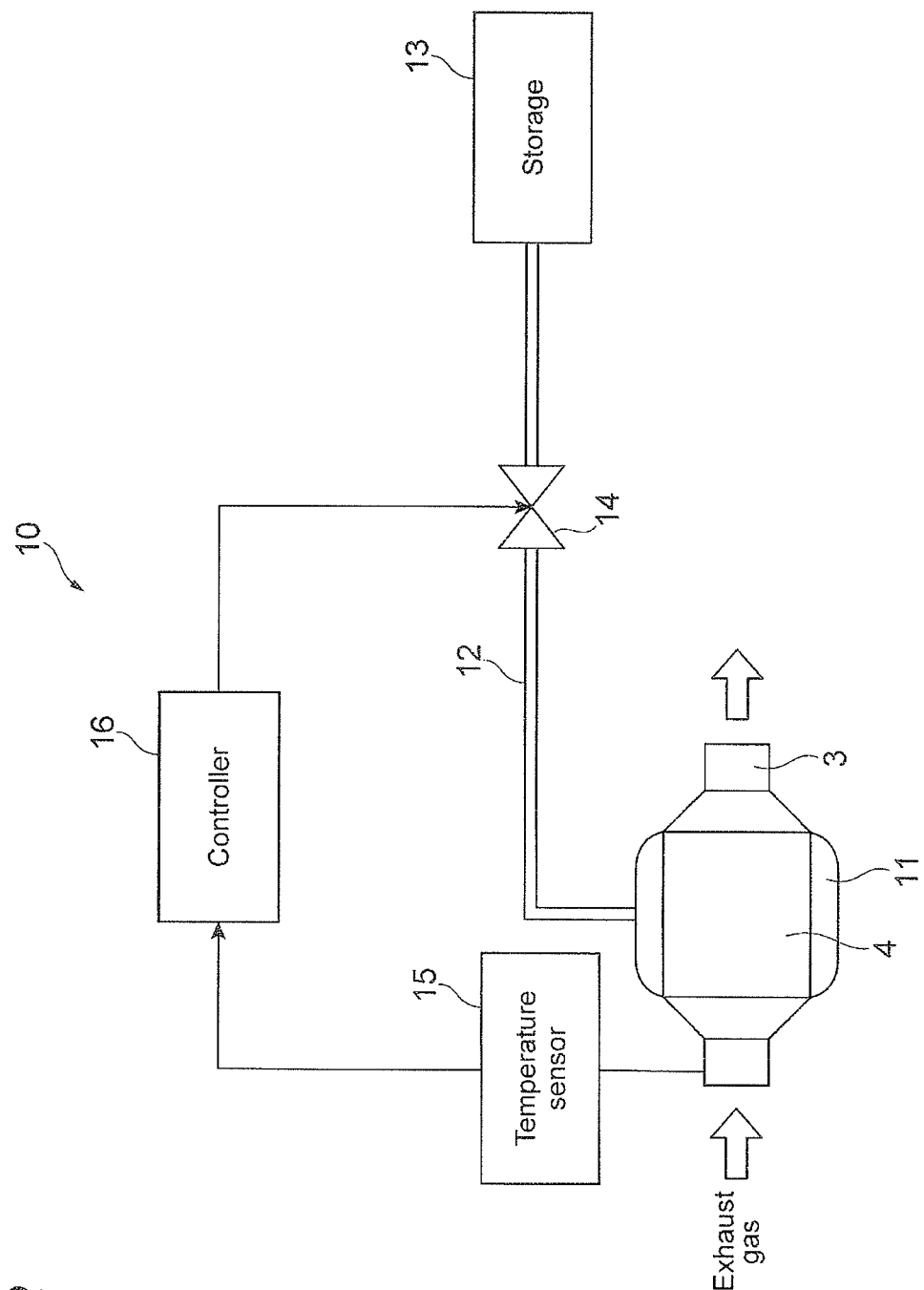
FIG. 2 is a schematic configuration showing an embodiment of the chemical heat storage device according to the present invention.

Then, the exhaust air purifying system 1 is provided with a chemical heat storage device 10 according to the present embodiment as shown in FIG. 2. The chemical heat storage device 10 normally stores the heat (waste heat) of the exhaust gas, and uses the heat when necessary to energy freely heat the oxidizing catalyst 4.

The chemical heat storage device 10 includes an annular reactor 11 disposed over the circumference of the oxidizing catalyst 4, a storage 13 connected to the reactor 11 through a pipe 12, and an electromagnetic on-off valve 14 disposed in the pipe 12. The reactor 11 is not limited to an annular type in particular; the reactor 11 may be partially disposed on the circumference of the oxidizing catalyst 4.

The reactor 11 contains a heat generating material $MgCl_2$ which chemically reacts with a reaction medium $NH_3$ (ammonia) to generate heat. The storage 13 stores $NH_3$ in a state of high pressure (for example, 2 to 8 atmospheric pressure) by adsorbing $NH_3$ onto activated carbon. The on-off valve 14 is a valve which opens/closes the flow path of $NH_3$.

If $MgCl_2$ contained in the reactor 11 are chemically reacted with $NH_3$ to form chemical adsorption (coordination bond), heat generates in the reactor 11. Namely, the reaction (exothermic reaction) from the left side to the right side in the following reaction equation (A) occurs. In contrast, if the heat (waste heat) of the exhaust gas is given to the reactor 11, $MgCl_2$ and $NH_3$ are separated (desorbed). Namely, the reaction (regeneration reaction) from the right side to the left side in the following reaction equation (A) occurs.

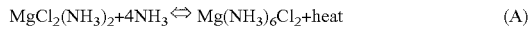

$$MgCl_2(NH_3)_2 + 4NH_3 \Leftrightarrow Mg(NH_3)_6Cl_2 + heat \quad (A)$$

Moreover, the chemical heat storage device 10 further includes a temperature sensor 15 and a controller 16. The temperature sensor 15 is disposed upstream of the oxidizing catalyst 4 or inside the oxidizing catalyst 4 in the exhaust air pipe 3, and detects the temperature of the exhaust gas passing through the oxidizing catalyst 4. The controller 16 controls the on-off valve 14 based on the detected value of the temperature sensor 15. The controller can include a computer.

Figure 3:
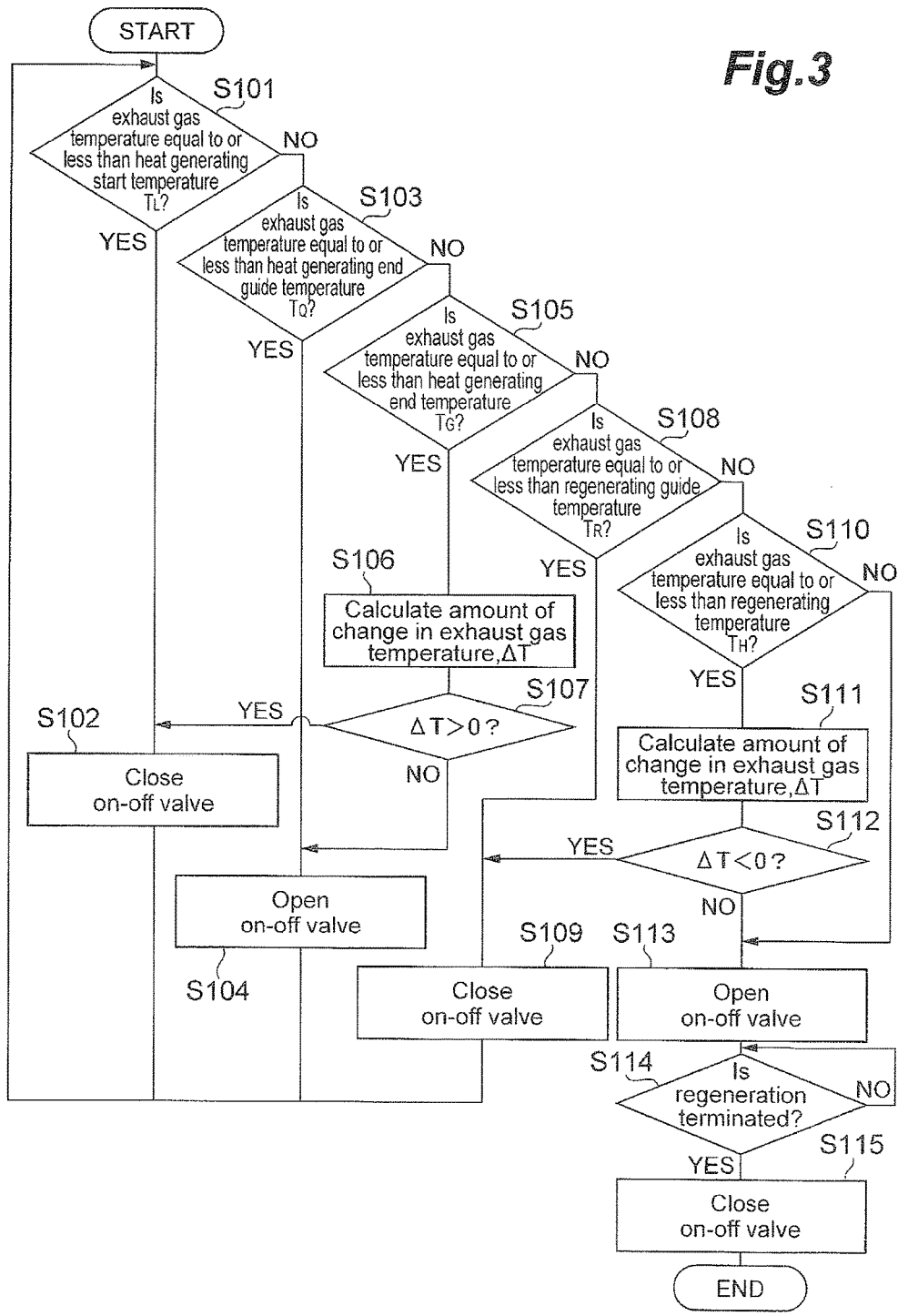
FIG. 3 is a flowchart showing the details of a processing procedure for controlling an on-off valve by a controller shown in FIG. 2.

FIG. 3 is a flowchart showing the details of the processing procedure for controlling the on-off valve by the controller 16. In the drawing, first, it is determined whether the temperature of the exhaust gas detected by the temperature sensor 15 is equal to or less than a heat generating start temperature $T_L$ (fifth predetermined value) (procedure S101). The heat generating start temperature $T_L$ is a temperature corresponding to the timing at which increasing of the temperature of the oxidizing catalyst 4 is started, namely a temperature at which the oxidizing catalyst 4 cannot reach the active temperature even if $MgCl_2$ and $NH_3$ are chemically reacted, for example, about 150° C. If it is determined that the temperature of the exhaust gas is equal to or less than the heat generating start temperature $T_L$, the on-off valve 14 is controlled to be closed (procedure S102), and the step returns to procedure S101.

If it is determined that the temperature of the exhaust gas is greater than the heat generating start temperature $T_L$, it is determined whether the temperature of the exhaust gas detected by the temperature sensor 15 is equal to or less than a heat generating end guide temperature $T_Q$ (fourth predetermined value) (procedure S103). The heat generating end guide temperature $T_Q$ is a temperature between the heat generating start temperature $T_L$ and a heat generating end temperature $T_G$ described later, for example, about 200 to 230° C. If it is determined that the temperature of the exhaust gas is equal to or less than the heat generating end guide temperature $T_Q$, the on-off valve 14 is controlled to be opened (procedure S104), and the step returns to procedure S101.

If it is determined that the temperature of the exhaust gas is greater than the heat generating end guide temperature $T_Q$, it is determined whether the temperature of the exhaust gas detected by the temperature sensor 15 is equal to or less than a heat generating end temperature $T_G$ (second predetermined value) (procedure S105). The heat generating end temperature $T_G$ is a temperature corresponding to the temperature immediately before the saturated state (maximum value) of the active temperature of the oxidizing catalyst 4, for example, about 250° C.

If it is determined that the temperature of the exhaust gas is equal to or less than the heat generating end temperature $T_G$, the amount of change in exhaust gas temperature (the amount of change in the detected value of the temperature sensor 15), $\Delta T$, is calculated from the following expression (procedure S106). The amount of change in exhaust gas temperature, $\Delta T$, is calculated, for example, as a rate of variation (differential value) in exhaust gas temperature.

$$\Delta T = (T - T_0)/t \quad (B)$$

where T: current (the latest) exhaust gas temperature
$T_0$: exhaust gas temperature before t seconds Subsequently, it is determined whether the amount of change in exhaust gas temperature, $\Delta T$, is more than 0 (procedure S107). If it is determined that the amount of change in exhaust gas temperature, $\Delta T$, is more than 0, the on-off valve 14 is controlled to be closed (procedure S102), and the step returns to procedure S101. If it is determined that the amount of change in exhaust gas temperature, $\Delta T$, is 0 or less, the on-off valve 14 is controlled to be opened (procedure S104), and the step returns to procedure S101.

If it is determined at procedure S105 that the temperature of the exhaust gas is greater than the heat generating end temperature $T_G$, it is determined whether the temperature of the exhaust gas detected by the temperature sensor 15 is equal to or less than a regenerating guide temperature $T_R$ (first predetermined value) (procedure S108). The regenerating guide temperature $T_R$ is a temperature immediately after $NH_3$ starts desorbing from $MgCl_2$ due to heat, for example, about 265° C. If it is determined that the temperature of the exhaust gas is equal to or less than the regenerating guide temperature $T_R$, the on-off valve 14 is controlled to be closed (procedure S109), and the step returns to procedure S101.

If it is determined that the temperature of the exhaust gas is greater than the regenerating guide temperature $T_R$, it is determined whether the temperature of the exhaust gas detected by the temperature sensor 15 is equal to or less than a regenerating temperature $T_H$ (third predetermined value) (procedure S110). The regenerating temperature $T_H$ is a temperature at which $NH_3$ completely desorbs from $MgCl_2$ due to heat, for example, about 290° C.

If it is determined that the temperature of the exhaust gas is equal to or less than the regenerating temperature $T_H$, the amount of change in exhaust gas temperature, $\Delta T$, is calculated from the above expression (B) in the same manner as in procedure S106 (procedure S111). Subsequently, it is determined whether the amount of change in exhaust gas temperature, $\Delta T$, is less than 0 (procedure S112). If it is determined that the amount of change in exhaust gas temperature, $\Delta T$, is less than 0, the on-off valve 14 is controlled to be closed (procedure S109), and the step returns to procedure S101. If it is determined that the amount of change in exhaust gas temperature, $\Delta T$, is 0 or more, the on-off valve 14 is controlled to be opened (procedure S113).

If it is determined that the temperature of the exhaust gas is greater than the regenerating temperature $T_H$ in procedure S110, the on-off valve 14 is controlled to be opened (procedure S113).

After the procedure S113 is performed, it is determined whether the regeneration reaction is terminated or not (procedure S114). The termination of the regeneration reaction can be determined from the integration value of the temperature of the exhaust gas and the regeneration time, or can be determined by detecting the pressure inside the storage 13, for example. If it is determined that the regeneration reaction is terminated, the on-off valve 14 is controlled to be closed (procedure S115), and the processing is terminated.

In the above procedure, the temperature sensor 15 is configured as a detecting unit (detector) detecting the temperature of the exhaust gas passing through the target object of heating (oxidizing catalyst 4). The controller 16 is configured as an on-off valve control unit (on-off valve controller) controlling the on-off valve 14 based on the detected value of the detecting unit.

Figure 4:
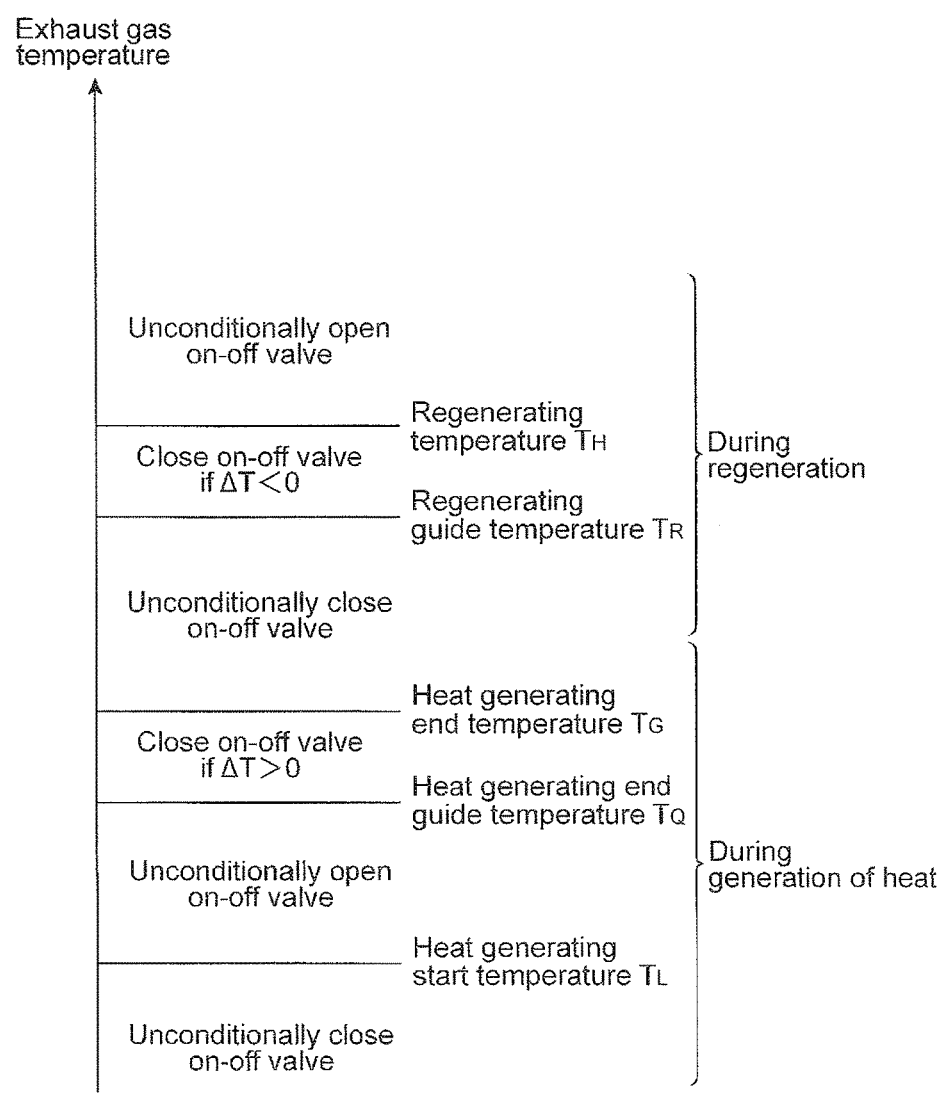
FIG. 4 is a timing chart showing the relation between the temperature of the exhaust gas and the open/close state of the on-off valve obtained by the control procedure shown in FIG. 3.

FIG. 4 is a timing chart showing the relation between the temperature of the exhaust gas and the open/close state of the on-off valve 14. In the drawing, the on-off valve 14 is controlled by the processing of the controller 16 as follows.

Namely, during generation of heat, if the temperature of the exhaust gas is equal to or less than the heat generating start temperature $T_L$, the on-off valve 14 is unconditionally closed; if the temperature of the exhaust gas is greater than the heat generating start temperature $T_L$ and is equal to or less than the heat generating end guide temperature $T_Q$, the on-off valve 14 is unconditionally opened. Moreover, if the temperature of the exhaust gas is greater than the heat generating end guide temperature $T_Q$ and is equal to or less than the heat generating end temperature $T_G$, the on-off valve 14 is closed if the amount of change in exhaust gas temperature, $\Delta T$, is more than 0, namely if the temperature of the exhaust gas tends to increase, and the on-off valve 14 is opened if the amount of change in exhaust gas temperature, $\Delta T$, is 0 or less, namely, if the temperature of the exhaust gas does not tend to increase. Moreover, if the temperature of the exhaust gas is greater than the heat generating end temperature $T_G$, the on-off valve 14 is unconditionally closed.

In contrast, during regeneration, if the temperature of the exhaust gas is equal to or less than the regenerating guide temperature $T_R$, the on-off valve 14 is unconditionally closed. Moreover, if the temperature of the exhaust gas is greater than the regenerating guide temperature $T_R$ and is equal to or less than the regenerating temperature $T_H$, the on-off valve 14 is closed if the amount of change in exhaust gas temperature, $\Delta T$, is less than 0, namely, the temperature of the exhaust gas tends to decrease, and the on-off valve 14 is opened if the amount of change in exhaust gas temperature, $\Delta T$, is 0 or more, namely, the temperature of the exhaust gas does not tend to decrease. Moreover, if the temperature of the exhaust gas is greater than the regenerating temperature $T_H$, the on-off valve 14 is unconditionally opened.

In the exhaust air purifying system 1 including the chemical heat storage device 10 described above, the on-off valve 14 remains closed if the temperature of the exhaust gas is low, for example, immediately after the engine 2 starts. If the temperature of the exhaust gas increases to reach the heat generating start temperature $T_L$, the on-off valve 14 is opened. Then, because the pressure inside the storage 13 is higher than the pressure inside the reactor 11, $NH_3$ adsorbed by the storage 13 is fed to the reactor 11 through the pipe 12, and chemically reacts with $MgCl_2$ in the reactor 11 to be chemically adsorbed, generating heat in the reactor 11. Namely, the exothermic reaction described above occurs. The heat generated in the reactor 11 conducts to the oxidizing catalyst 4 to heat the oxidizing catalyst 4 to the active temperature.

Then, if the temperature of the exhaust gas further increases to reach the heat generating end guide temperature $T_Q$, and if the amount of change in exhaust gas temperature, $\Delta T$, is more than 0 and the temperature of the exhaust gas tends to increase, the on-off valve 14 is closed. Then, because feed of $NH_3$ from the storage 13 to the reactor 11 is stopped, the exothermic reaction is terminated. Moreover, if the temperature of the exhaust gas reaches the heat generating end guide temperature $T_Q$ and the temperature of the exhaust gas does not tend to increase, the on-off valve 14 is kept open; for this reason, the exothermic reaction is continued. Moreover, if the temperature of the exhaust gas further increases to reach the heat generating end temperature $T_G$, the on-off valve 14 is closed irrespective of the amount of change in exhaust gas temperature, $\Delta T$; for this reason, the exothermic reaction is terminated.

Subsequently, if the temperature of the exhaust gas further increases to reach the regenerating guide temperature $T_R$, the heat (waste heat) of the exhaust gas is given from the oxidizing catalyst 4 to the reactor 11 to separate $MgCl_2$ from $NH_3$, causing the regeneration reaction described above. At this time, if the amount of change in exhaust gas temperature, $\Delta T$, is less than 0 and the temperature of the exhaust gas tends to decrease, the on-off valve 14 remains closed.

In contrast, if the amount of change in exhaust gas temperature, $\Delta T$, is 0 or more and the temperature of the exhaust gas does not tend to decrease, the on-off valve 14 is opened. Then, because the pressure of the reactor 11 is higher than the pressure of the storage 13, $NH_3$ separated from $MgCl_2$ passes through the pipe 12 to return to the storage 13; $NH_3$ is adsorbed by activated carbon to be recovered. Moreover, if the temperature of the exhaust gas further increases to reach the regenerating temperature $T_H$, separation (regeneration) of $MgCl_2$ and $NH_3$ is promoted to open the on-off valve 14 irrespective of the amount of change in exhaust gas temperature, $\Delta T$; for this reason, $NH_3$ is recovered in the storage 13.

Subsequently, if the regeneration reaction is terminated, the on-off valve 14 is closed; for this reason, recovery of $NH_3$ to the storage 13 is terminated, and $NH_3$ is stored (charged) in the storage 13 under high pressure.

As described above, in the present embodiment, during regeneration, the on-off valve 14 is closed until the temperature of the exhaust gas reaches the regenerating temperature $T_H$ excluding the case if the temperature of the exhaust gas is greater than the regenerating guide temperature $T_R$ and the amount of change in exhaust gas temperature, $\Delta T$, is 0 or more; thereby, unintentional occurrence of the reverse reaction (exothermic reaction) can be prevented even if the temperature of the exhaust gas decreases during driving uphill, for example, to fall under a condition not enable regeneration.

In contrast, during generation of heat, the on-off valve 14 is closed if the temperature of the exhaust gas reaches the heat generating end temperature $T_G$ or if the temperature of the exhaust gas reaches the heat generating end guide temperature $T_Q$ and the amount of change in exhaust gas temperature, $\Delta T$, is more than 0; thereby, the exothermic reaction does not occur beyond necessity, and the charge quantity of $NH_3$ in the storage 13 can be saved.

Moreover, if the temperature of the exhaust gas is excessively low and the exothermic reaction occurs, the temperature of the exhaust gas does not reach the active temperature of the oxidizing catalyst 4, and the oxidizing catalyst 4 is barely activated. In the present embodiment, however, the on-off valve 14 remains closed until the temperature of the exhaust gas reaches the heat generating start temperature $T_L$, activation of the oxidizing catalyst 4 can be promoted without wasting $NH_3$ in the storage 13.

As described above, because the on-off valve 14 is appropriately controlled according to the temperature of the exhaust gas flowing through the oxidizing catalyst 4, the regeneration reaction and the exothermic reaction can be appropriately performed according to the temperature of the exhaust gas. Thereby, loss can be reduced during regeneration and generation of heat, so that the chemical heat storage device 10 can be effectively utilized.

It should be noted that the present invention is not limited to the embodiment above. For example, the temperature sensor 15 directly detecting the temperature of the exhaust gas passing through the oxidizing catalyst 4 has been used in the embodiment above, the target detected by the temperature sensor is not limited to this in particular; the temperature sensor can detect any detection target corresponding to the temperature the exhaust gas passing through the oxidizing catalyst 4. Examples of such a detection target other than the exhaust gas temperature include the temperature of the oxidizing catalyst 4 as a target object of heating, the temperature of the reactor 11, and the pressure in the reactor 11.

Moreover, the procedure shown in FIG. 3 is all performed by the controller 16 in the embodiment above, but the procedure is not limited to such processing in particular. For example, the procedures S101 and S102 may not be performed, the procedures S103, S106, and S107 may not be performed, or the procedures S110 to S112 may not be performed in FIG. 3. In short, in FIG. 3, at least the procedures S104, S105, S108, S109, and S113 to S115 may be performed.

Moreover, although $MgCl_2$ has been used as the heat generating material chemically reacted with $NH_3$ in the embodiment above, other heat generating materials such as $CaCl_2$, $NiCl_2$, $ZnCl_2$, and $SrCl_2$ can also be used. Moreover, although $NH_3$ has been used as the reaction medium chemically reacted with the heat generating material, the reaction medium is not limited to $NH_3$ in particular, and $H_2O$ may be used. In this case, as the heat generating material chemically reacted with $H_2O$, CaO, MgO, MnO, CuO, $Al_2O_3$ or the like can be used. At this time, the heat generating start temperature $T_L$, the regenerating guide temperature $T_R$, and the regenerating temperature $T_H$ are appropriately determined according to the type and the amount of the reaction medium to be used, the type and the amount of the heat generating material to be used and the like. The heat generating end guide temperature $T_Q$ and the heat generating end temperature $T_G$ are appropriately determined according to the type and the amount of the reaction medium to be used, the type and the amount of the heat generating material to be used, the activation starting temperature of the catalyst as the heating target and the like.

Moreover, the embodiment above relates to the chemical heat storage device 10 heating the oxidizing catalyst 4; the chemical heat storage device according to the present invention can be applied to devices heating an exhaust air catalyst disposed in an exhaust air system in diesel engines or gasoline engines, or devices heating other target objects of heating (such as exhaust air pipes) disposed in exhaust air systems.

REFERENCE SIGNS LIST

2 . . . diesel engine, 3 . . . exhaust air pipe (exhaust air system), 4 . . . oxidizing catalyst (exhaust air catalyst, target object of heating), 10 . . . chemical heat storage device, 11 . . . reactor, 12 . . . pipe, 13 . . . storage, 14 . . . on-off valve, 15 . . . temperature sensor (detecting unit, detector), 16 . . . controller (on-off valve control unit, on-off valve controller).

The invention claimed is:

1. A chemical heat storage device heating a target object of heating disposed in an exhaust air system of an engine, the chemical heat storage device comprising:
    a reactor disposed around the target object of heating, the reactor having a heat generating material which chemically reacts with a reaction medium to generate heat;
    a storage connected to the reactor through a pipe to store the reaction medium;
    an on-off valve disposed in the pipe to open and close a flow path for the reaction medium;
    a detector detecting a detection target corresponding to a temperature of an exhaust gas passing through the target object of heating; and
    an on-off valve controller controlling the on-off valve based on a detected value of the detector, wherein
    the on-off valve controller controls the on-off valve such that the on-off valve opens if a detected value of the detector is greater than a first predetermined value at which the reaction medium desorbs from the heat generating material due to heat, controls the on-off valve such that the on-off valve opens if the detected value of the detector is equal to or less than a second predetermined value lower than the first predetermined value, and controls the on-off valve such that the on-off valve closes if the detected value of the detector is equal to or less than the first predetermined value and is greater than the second predetermined value,
    the on-off valve controller controls the on-off valve such that if the detected value of the detector is greater than the first predetermined value and the detected value of the detector is equal to or less than a third predetermined value greater than the first predetermined value,
    the on-off valve closes if the amount of change in the detected value of the detector is less than 0, and
    the on-off valve opens if the amount of change in the detected value of the detector is 0 or more.

2. A chemical heat storage device heating a target object of heating disposed in an exhaust air system of an engine, the chemical heat storage device comprising:
    a reactor disposed around the target object of heating, the reactor having a heat generating material which chemically reacts with a reaction medium to generate heat;
    a storage connected to the reactor through a pipe to store the reaction medium;
    an on-off valve disposed in the pipe to open and close a flow path for the reaction medium;
    a detector detecting a detection target corresponding to a temperature of an exhaust gas passing through the target object of heating; and
    an on-off valve controller controlling the on-off valve based on a detected value of the detector, wherein
    the on-off valve controller controls the on-off valve such that the on-off valve opens if a detected value of the detector is greater than a first predetermined value at which the reaction medium desorbs from the heat generating material due to heat, controls the on-off valve such that the on-off valve opens if the detected value of the detector is equal to or less than a second predetermined value lower than the first predetermined value, and controls the on-off valve such that the on-off valve closes if the detected value of the detector is equal to or less than the first predetermined value and is greater than the second predetermined value,
    the on-off valve controller controls the on-off valve such that if the detected value of the detector is equal to or less than the second predetermined value and the detected value of the detector is greater than a fourth predetermined value lower than the second predetermined value, the on-off valve closes if the amount of change in the detected value of the detector is more than 0, and the on-off valve opens if the amount of change in the detected value of the detector is 0 or less.

3. A chemical heat storage device heating a target object of heating disposed in an exhaust air system of an engine, the chemical heat storage device comprising:

a reactor disposed around the target object of heating, the reactor having a heat generating material which chemically reacts with a reaction medium to generate heat;

a storage connected to the reactor through a pipe to store the reaction medium;

an on-off valve disposed in the pipe to open and close a flow path for the reaction medium;

a detector detecting a detection target corresponding to a temperature of an exhaust gas passing through the target object of heating; and an on-off valve controller controlling the on-off valve based on a detected value of the detector, wherein the on-off valve controller controls the on-off valve such that the on-off valve opens if a detected value of the detector is greater than a first predetermined value at which the reaction medium desorbs from the heat generating material due to heat, controls the on-off valve such that the on-off valve opens if the detected value of the detector is equal to or less than a second predetermined value lower than the first predetermined value, and controls the on-off valve such that the on-off valve closes if the detected value of the detector is equal to or less than the first predetermined value and is greater than the second predetermined value, and the on-off valve controller controls the on-off valve such that the on-off valve closes if the detected value of the detector is equal to or less than the second predetermined value and the detected value of the detector is equal to or less than a fifth predetermined value at which the target object of heating cannot reach a target temperature even if the reaction medium is chemically reacted with the heat generating material.

* * * * *